(12) United States Patent
Ling et al.

(10) Patent No.: US 12,164,894 B2
(45) Date of Patent: Dec. 10, 2024

(54) METHODS, DEVICES, AND MEDIA FOR TWO-PASS SOURCE CODE TRANSFORMATION

(71) Applicants: Michael Ling, Kingston (CA); Yijun Yu, Milton Keynes (GB); Haitao Wu, Kingston (CA); Yuan Wang, Kingston (CA); Ahmed E. Hassan, Kingston (CA)

(72) Inventors: Michael Ling, Kingston (CA); Yijun Yu, Milton Keynes (GB); Haitao Wu, Kingston (CA); Yuan Wang, Kingston (CA); Ahmed E. Hassan, Kingston (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 17/698,661

(22) Filed: Mar. 18, 2022

(65) Prior Publication Data
US 2022/0357934 A1    Nov. 10, 2022

Related U.S. Application Data

(60) Provisional application No. 63/184,602, filed on May 5, 2021.

(51) Int. Cl.
*G06F 8/51* (2018.01)
*G06F 8/41* (2018.01)

(52) U.S. Cl.
CPC ............... *G06F 8/51* (2013.01); *G06F 8/425* (2013.01); *G06F 8/427* (2013.01)

(58) Field of Classification Search
CPC ........................................................ G06F 8/51
(Continued)

(56) References Cited

U.S. PATENT DOCUMENTS 8,533,690 B2 * 9/2013 McAtamney ............. G06F 8/51
717/137
8,843,909 B2 * 9/2014 Tondreau, Jr. ............ G06F 8/45
717/130
(Continued)

FOREIGN PATENT DOCUMENTS

CN    107111503 A    8/2017
CN    107861728 A * 3/2018  ............... G06F 8/51
(Continued)

OTHER PUBLICATIONS

Nico Borgsmuller "The Rust Programming Language for Embedded Software Development"; Bachelor's Thesis—Computer Science, May 11, 2020; MBDA Missile Systems, Technische Hochschule Ingolstadt.*
(Continued)

*Primary Examiner* — Francisco J Aponte

(57) ABSTRACT

Methods, devices and media for two-pass source code transformation from a first high-level programming language to a second high-level programming language are described. Two different source code transformation technologies are combined to produce a two-pass source code transformation method: a compiler-based source code transformation technique is used in a first pass, and a parse-tree-based source code transformation technique is used in second pass. The second pass may be used to automatically refactor the source code to enhance desired properties of the second programming language. A two-pass C-to-Rust transformation technique, CRustS, is described which automatically generates Rust source code that exhibits memory safety and overcomes other limitations of existing tools such as C2Rust.

20 Claims, 13 Drawing Sheets

(58) Field of Classification Search
USPC .......................................................... 717/137
See application file for complete search history.

(56) References Cited

U.S. PATENT DOCUMENTS

| | | | | |
|---|---|---|---|---|
| 9,239,710 B2* | 1/2016 | Araya | ........................ | G06F 8/42 |
| 9,684,496 B1* | 6/2017 | Reid | ........................ | G06F 8/425 |
| 9,710,243 B2* | 7/2017 | O'Hara | ........................ | G06F 8/71 |
| 9,804,946 B2* | 10/2017 | Conlon | ........................ | G06F 8/433 |
| 10,140,105 B2* | 11/2018 | Kellicker | ........................ | G06F 8/51 |
| 10,691,434 B2* | 6/2020 | Shah | ........................ | G06F 8/315 |
| 11,726,750 B1* | 8/2023 | Arcadinho | ........................ | G06F 8/33 |
| | | | | 717/113 |
| 2004/0194072 A1* | 9/2004 | Venter | ........................ | G06F 8/427 |
| | | | | 717/114 |
| 2014/0282373 A1* | 9/2014 | Garza | ........................ | G06F 8/51 |
| | | | | 717/106 |
| 2015/0057993 A1* | 2/2015 | Phadke | ........................ | G06F 40/151 |
| | | | | 704/3 |
| 2016/0062753 A1 | 3/2016 | Champagne | | |
| 2018/0275977 A1 | 9/2018 | Kudriavtsev et al. | | |
| 2020/0183670 A1* | 6/2020 | Kumar | ........................ | G06F 8/425 |
| 2020/0285454 A1 | 9/2020 | Antonevich et al. | | |

FOREIGN PATENT DOCUMENTS

| | | | | |
|---|---|---|---|---|
| CN | 108139892 A | 6/2018 | | |
| CN | 111651165 A | 9/2020 | | |
| WO | WO-2008108665 A1 * | 9/2008 | ................ | G06F 8/51 |
| WO | WO-2014040766 A1 * | 3/2014 | ................ | G06F 8/51 |

OTHER PUBLICATIONS

B. S. Martins et al. "Benefits and Drawbacks of Using Rust in an Exisitng C/C++ Codebase"; 17th Int. Conf. on Acc. and Large Exp. Physics Control Systems—2019.*

Jaemin Hong et al. "Concrat: An Automatic C-to-Rust Lock API Translator for Concurrent Programs"; 2023 IEEE/ACM 45th International Conference on Software Engineering (ICSE).*

Michael Ling et al. "In RustWe Trust—A Transpiler from Unsafe C to Safer Rust"; 2022 IEEE/ACM 44th International Conference on Software Engineering: Companion Proceedings (ICSE—Companion).*

Lei Xia et al. "An Empirical Study of C to Rust Transpilers"; School of Software Engineering, University of Science and Technology of China, and Suzhou Institute for Advanced Research, University of Science and Technology of China—Apr. 27, 2023.*

Martin Taibr "Translating QuakeC to Rust"; Fakulya Informacnich Technologi Cvut V Praze, Department of Theoretical Informatics—2019 (Machine Translation).*

Jaemin Hong "Improving Automatic C-to-Rust Translation with Static Analysis"; School of Computing KAIST Daejeon, South Korea—2023 IEEE/ACM 45th International Conference on Software Engineering: Companion Proceedings (ICSE—Companion).*

Mehmet Emre et al. "Translating C to Safer Rust"; Mehmet Emre, Ryan Schroeder, Kyle Dewey, and Ben Hardekopf. 2021. Translating C to Safer Rust. Proc. ACM Program. Lang. 5, OOPSLA, Article 121 (Oct. 2021), 29 pages. https://doi.org/10.1145/3485498.*

Rijnard van Tonder et al. "Lightweight Multi-Language Syntax Transformation with Parser Parser Combinators"; PLDI '19, June 22$\mathrm{\acute{s}}$26, 2019, Phoenix, AZ, USA.*

* cited by examiner

Input : Rust function f: FunctionQualifiers unsafe fn
IDENTIFIER GenericParams? (
FunctionParameters? ) FunctionReturnType?
WhereClause? { InnerAttribute* Statements? }
Output:Rust function f': FunctionQualifiers fn IDENTIFIER
GenericParams? ( FunctionParameters? )
FunctionReturnType? WhereClause? { unsafe {
InnerAttribute* Statements? } }
1 if FunctionParameters does not contain a parameter that is
variadic or of unsafe type then
2 remove unsafe keyword in f
3 enclose function body of f in an unsafe block
4 end

1104

Input :unsafeSymbols: a set of symbols that can cause an
expression to be unsafe
unsafeArguments: a set of arguments that can cause an
expression to be unsafe
unsafeLocalVariables: a set of variable that can cause an
expression to be unsafe
localPointerVariables: a set of variables that are of raw
pointer type
Rust function f: FunctionQualifiers fn IDENTIFIER
GenericParams? ( FunctionParameters? )
FunctionReturnType? WhereClause? { unsafe {
InnerAttribute* Statements? } }
Output: Rust function f': FunctionQualifiers fn
IDENTIFIER GenericParams? (
FunctionParameters? ) FunctionReturnType?
WhereClause? { InnerAttribute* Statements? }
1 $allUnsaf\,eIds \leftarrow unsaf\,eSymbols \cup unsaf\,eArguments \cup unsaf\,eLocalVariables$
2 replace unsafe { InnerAttribute* Statements? } with
InnerAttribute* Statements?
3 foreach statement $s$ in Statements do if
$isSafe\,(s,\,allUnsaf\,eIds,\,localPointerVariables) \equiv False$
then
4 replace $s$ with unsafe block $b$: unsafe { $s$ }
5 end

1106

Input :$s$: Statement
allUnsafeIds: a set of Id's that causes expression to be unsafe
(i.e. Id of unsafe symbols, unsafe types, unsafe
parameters of the function, unsafe local variables)
localPointerVariables: a set of variables that are of raw
pointer type
Output:True if given $s$ is safe, False otherwise
1 if $s$ contains any $Id \in allUnsaf\,eIds$ then
2 return False
3 end
4 if $s$ contains any pointer dereference operation then
5 return False
6 end
7 if $s$ contains invokes asm! macro then
8 return False
9 end
10 if $s$ contains any macro invocation that contains dereference
of any $v \in localPointerVariables$ then
11 return False
12 end
13 return True

FIG. 11

METHODS, DEVICES, AND MEDIA FOR TWO-PASS SOURCE CODE TRANSFORMATION

RELATED APPLICATIONS

The present application claims priority to U.S. provisional patent application No. 63/184,602 filed May 5, 2021, the entire contents of which are incorporated herein by reference.

FIELD

The present disclosure is related to methods, devices, and media for source code transformation, and in particular to methods, devices, and media for two-pass source code transformation.

BACKGROUND

Digital computers include different components of hardware (e.g., processor devices such as central processing units (CPUs) and graphics processing units (GPUs), memory, and input/output (IO) devices) and software that interact together to implement high-level functionality specified by programmers. Programmers write human-readable software source code specifying this functionality. Due to the complexity of this interaction between the different organizations and structures of the underlying hardware (e.g., processors' architectures, Instruction Set Architecture (ISA), features, etc.) and the target software applications, compilers have been introduced as an intermediary agent between software and hardware.

Source code is written in a programming language. Over time, many programming languages have been invented. It is sometimes desirable to transform a program written as source code in one programming language into source code in another programming language. Compilers may provide tools supporting such transformation: for example, a C compiler may be used to transform source code written in the C programming language into assembly code, and an assembler may then be used to transform assembly code into machine code, which can be directly executed by a processor.

As used herein, the term "compiler" generally refers to software that carries out all stages of the compilation process for transforming source code into machine code, including preprocessing of source code, compilation per se of the preprocessed source code, assembly, and linking. Whereas the term "compiler" is sometimes understood to refer to the software that only performs the second of these stages (compilation per se), as used herein the term may refer to the software that performs all four stages.

FIG. 1 (prior art) shows an example of source code transformation 100 by a compiler from a high-level programming language (e.g. C) to a low-level programming language (e.g. assembly). High-level programming languages are programming languages with a high level of abstraction from the hardware details of the computer; in contrast, low-level programming languages have little or no abstraction from the hardware of the computer. Low-level programming languages include assembly language and machine code; high-level programming languages include most modern human-readable programming languages, such as C, C++, C#, Java, Perl, Lisp, Python, Ruby, Rust, PHP, Delphi, BASIC, Visual Basic, and Javascript, as well as autocodes such as Fortran and COBOL. In modern computer programming, high-level programming languages are typically used by human programmers to write source code, whereas low-level programming languages are typically generated by a compiler based on source code written in a high-level programming language.

In the illustrated example, a first source code base 102 is written in a high-level first programming language, such as the C programming language. The high-level programming language of the first source code base may be referred to herein as the first programming language. A "code base" or "source code base", as used herein, refers to a collection of source code written in a single programming language. In some examples, a source code base may comprise all of the source code for a computer program.

A lexical parser 104, syntax parser 108, semantic parser 112, and optimizer 116 of a compiler (i.e., a compiler of the first programming language, such as a C compiler) are used to generate an abstract syntax tree (AST) or other intermediate representation (IR) of the first source code base 102, such as assembly code corresponding to the first source code base 102. The lexical parser 104 is used to parse the first source code base 102 to generate a set of lexical tokens 106. The syntax parser 108 is used to parse the lexical tokens 106 to generate an AST or IR 110. The AST or IR 110 is parsed by the semantic parser 112 to generate an updated AST or IR 114. The updated AST or IR 114 is optimized by the AST or IR optimizer 116 to generate a second updated AST or IR 118.

The second updated AST or IR 118 is then processed by a code generator 120 for a second programming language (i.e. a low-level programming language such as assembly language or machine code) to generate a second source code base 122 in the second (low-level) programming language corresponding to the logic of the first code base 102.

The AST or other IR 110 and its updated counterparts 114, 118 are generated according to a definition of the first programming language encoded by the compiler for the first programming language. FIG. 2 (prior art) shows an example AST 110 generated by the syntax parser 108 of FIG. 1. The AST 110 corresponds to the following pseudo-code logic:

```
while (b != 0) {
    if (b > a) { a : = a-b; }
    else { b : = b-a; }
}
return a;
```

The AST 110 includes a root node 202 corresponding to the statement sequence of the entire AST 110. Below the root node are a while node 204 and a return node 242. Branching as a condition branch from the while node 204 is a compare node 206 for the comparison operation != (not equal to), and branching as a body branch is a branch node 212. Below the compare node 206 are a variable node 208 for variable name b and a constant value node 210 for value 0 (zero). The branch node 212 branches into a condition branch to a comparison node 214 for the comparison operation > (greater than); below the comparison node 214 are a variable node 216 for variable name b and a variable node 218 for variable name a. The branch node 212 branches into an if-body branch to an assign node 220; below the assign node 220 are a variable node 222 for variable name a and a binary operation node 224 for operation − (minus). Below the binary operation node 224 are a variable node 226 for variable name a and a variable node 228 for variable name b. The branch node 212 branches into an else-body branch to an assign node 230; below the assign node 230 are a variable node 232 for variable name b and a binary operation node 234 for operation − (minus). Below the binary operation node 234 are a variable node 236 for variable name b and a variable node 238 for variable name a. Below the return node 240 is a variable node 242 for variable name a.

Thus, the AST 110 generated by the syntax parser 108 during transformation of source code in a high-level programming language to source code in a low-level programming language may represent the abstract syntax of the expressions or statement sequences of the high-level programming language source code.

However, in some cases, it is desirable to transform or translate source code written in a first high-level programming language into a second high-level programming language. For example, legacy code written in an older high-level programming language, or a general-purpose and widespread high-level programming language, may need to be converted to a newer or more domain-specific second high-level programming language to take advantage of features or properties of the second high-level programming language. There are two general approaches to transforming a source code base from a first high-level programming language to a second high-level programming language, shown in FIGS. 3 and 4 respectively.

FIG. 3 (prior art) shows a first approach to transformation 300 of the first source code base 102, written in the first high-level programming language (e.g., C) into a second source code base 322 in a second high-level programming language (e.g., Python). The transformation 300 proceeds initially as the transformation 100 shown in FIG. 1 from a high-level programming language to a low-level programming language, resulting in an AST 310 being generated according to the definition of the first high-level programming language like the AST 110 of FIGS. 1-2. Similarly, the semantic parser 112 of the compiler for the first high-level programming language updates the AST 310 to generate an updated AST 314 according to the definition of the first high-level programming language. However, an AST transformer 316 is then used to transform the updated AST 314 according to the definition of the first high-level programming language into a second AST 318 according to the definition of the second high-level programming language. The AST transformer 316 may use a definition of the second high-level programming language encoded by a compiler for the second high-level programming language to transform the updated AST 314 into the second AST 318.

An AST reverser 320 for the second high-level programming language is then used to reverse the process of AST generation from source code, thereby generating a second source code base 322 in the second high-level programming language. Like the AST transformer 316, the AST reverser 320 may rely upon (i.e. reverse) the AST generation logic of the compiler for the second high-level programming language to perform the AST reversal process.

The approach to high-level programming language transformation 300 based on compiler technology shown in FIG. 3 may exhibit one or more limitations. The constraints imposed by compiler-defined AST data structures, compilers' approaches to processing ASTs, and discrepancies between the two high-level programming languages may present difficulties in guaranteeing the consistent transmission of all properties of the first high-level programming language to the second high-level programming language.

Furthermore, if the second high-level programming language provides desirable properties such as unique syntax, semantics, and other language features that do not exist in the first high-level programming language, such compiler-based transformation 300 may face additional difficulties in properly utilizing these desirable properties of the second high-level programming language.

FIG. 4 (prior art) shows a second approach to transformation 400 of the first source code base 102, written in the first high-level programming language (e.g., C) into the second source code base 322 in a second high-level programming language (e.g., Python), without use of a compiler. The transformation 400 in this approach relies upon a grammar for the first high-level programming language 430 to enable a lexical parser 104 and syntax parser 108 to parse the first source code base to generate a first parse tree 410 defined according to the first high-level programming language. The grammar for the first high-level programming language 430 and a grammar for the second high-level programming language 432 are used to enable a parse tree transformer 416 to process the first parse tree 410 to generate a second parse tree 418 defined according to the second high-level programming language. The grammars 430, 432 assure that the first parse tree 410 and second parse tree 418 align to the first and second high-level programming languages' grammar definitions respectively, enabling a parse tree reverser 420, operating according to the grammar for the second high-level programming language 432, to generate a syntactically correct second source code base 322 in the second high-level programming language.

In the second approach to transformation 400, the parse trees 410, 418 typically contain much less information than the ASTs 310, 314, 318 of the first approach to transformation 300. For example, a node in a parse tree representing a variable does not usually contain information or annotation about the type and value of the variable.

The second approach to transformation 400 may also exhibit limitations. Because semantic analysis is not typically performed as part of the transformation 400, and many high-level programming languages (such as C) do not strictly use context-free grammar, some lexical tokens could be mis-parsed by the syntax parser 104. This may lead to syntactically correct, but semantically erroneous, results.

Thus, there exists a need for methods of transforming source code in a first high-level programming language into source code in a second high-level programming language that overcome one or more of the limitations of the existing approaches described above.

SUMMARY

In various embodiments described herein, methods, devices and media are disclosed that provide two-pass source code transformation from a first high-level programming language to a second high-level programming language. Two different source code transformation technologies are combined to produce a two-pass source code transformation method that can transform a first source code base written in a first high-level programming language (also referred to as the "first programming language" or "source programming language" herein) into a second source code base written in a second high-level programming language (also referred to as the "second programming language" or "target programming language" herein).

Embodiments of the two-pass source code transformation methods described herein combine a compiler-based source code transformation technique, similar to the approach described above with reference to FIG. 3, as a first pass with a parse-tree-based source code transformation technique, similar to the approach described above with reference to FIG. 4, as a second pass to form a two-pass transformation method. The compiler-based technique of the first pass is performed on a first source code base written in a first high-level programming language to generate functionally equivalent source code in the second high-level programming language. The resulting functionally equivalent source code in the second high-level programming language may be regarded as a first-pass source code base. The first-pass source code base is provided as input to the second pass, wherein a parse-tree-based technique may be used to refactor the first-pass source code base to enhance the desired properties of the second programming language.

As used herein, the term "language" refers to a programming language, and can be assumed to refer to a high-level programming language unless otherwise indicated, as the described embodiments are directed toward transformation between two high-level programming languages.

As used herein, the term "refactor" refers to modification or transformation of source code within the context of a single programming language. Thus, as described herein, a set of transformation rules may be applied to source code written in a target programming language to refactor the code, thereby generating a new, refactored source code base written in the target programming language.

As used herein, the terms "unparser" or "reverser" refer to a functional module (such as a software module) that generates source code based on an abstract representation of a source code expression, such as a parse tree or an abstract syntax tree (AST). An unparser is typically specific to a given programming language, such that it generates source code in the given programming language based on an AST or parse tree representing an expression specific to the given programming language.

In some aspects, the present disclosure describes a method for processing a first source code base in a first programming language to generate a second source code base in a second programming language. The first programming language and second programming language are high-level programming languages. A first pass is performed, comprising: processing the first source code base using a first programming language compiler to generate an abstract syntax tree (AST), and processing the AST to generate a first-pass source code base in the second programming language. A second pass is performed, comprising: processing the first-pass source code base and a grammar of the second programming language to generate a first parse tree, processing the parse tree by applying a set of transformation rules to generate a second parse tree having one or more desired properties of the second programming language, and processing the second parse tree using a second-pass unparser to generate the second source code base.

In some aspects, the present disclosure describes a device, comprising a processor, and a memory storing instructions. The instructions, when executed by the processor, cause the device to process a first source code base in a first programming language to generate a second source code base in a second programming language. The first programming language and second programming language are high-level programming languages. A first pass is performed, comprising: processing the first source code base using a first programming language compiler to generate an abstract syntax tree (AST), and processing the AST to generate a first-pass source code base in the second programming language. A second pass is performed, comprising: processing the first-pass source code base and a grammar of the second programming language to generate a first parse tree, processing the parse tree by applying a set of transformation rules to generate a second parse tree having one or more desired properties of the second programming language, and processing the second parse tree using a second-pass unparser to generate the second source code base.

By combining aspects of the two approaches (i.e. compiler-based and parse-tree-based) into a two-pass method, limitations of both techniques may be addressed and resolved. The limitations of compiler-based program transformation may be addressed by the second by using a parse-tree-based technique having a more relaxed and generalized tree representation of the second source code base (i.e. a parse tree) than the AST representation used in compiler-based approaches. This may enable code patterns and logical structures to be matched at a higher level of abstraction relative to an AST. Higher level code transformations can be performed to restructure, rearrange, and/or rewrite the logical structures, statements, or expressions of the second programming language in order to utilize new language features, semantics, or syntax of the second programming language to realize or enhance the desired properties thereof.

By the same token, the limitations of a parse-tree-based technique can be avoided or mitigated by a two-pass approach by pre-parsing the first source code base in the first programming language using a compiler, such that any ambiguity in the grammar of the first programming language is handled properly by the compiler-based first pass. In the second pass, any ambiguity of the second programming language's grammar has minimal impact on the refactored result, as the transformation is being performed within the same language.

Some embodiments may exhibit various advantages over existing approaches described above, such as guaranteed functional correctness, realization of desired properties of the second programming language (such as new features, semantics, or syntax of the second programming language).

In some examples, processing the AST to generate the first-pass source code base comprises: processing the AST using a transformer to generate a second AST of the first source code base according to the second programming language, and processing the second AST using an AST unparser to generate the first-pass source code base.

In some examples, the transformer is generated based on the first programming language compiler and a second programming language compiler.

In some examples, processing the first source code base to generate the AST comprises: processing the first source code base using a compiler lexical parser to generate a set of first-pass lexical tokens, processing the set of first-pass lexical tokens using a compiler syntax parser to generate a preliminary AST, and processing the preliminary AST using a compiler semantic parser to generate the AST.

In some examples, processing the first-pass source code base and a grammar of the second programming language to generate the first parse tree comprises: processing the first-pass source code base and the grammar of the second programming language using a second-pass lexical parser to generate a set of second-pass lexical tokens, and processing the set of second-pass lexical tokens and the grammar of the second programming language using a second-pass syntax parser to generate the first parse tree.

In some examples, the second parse tree is generated based on the first parse tree and the grammar of the second programming language, and the second source code base is generated based on the second parse tree and the grammar of the second programming language.

In some examples, the method further comprises, after performing the second pass, performing one or more additional iterations of the second pass. Each iteration uses the second source code base generated by the previous iteration in place of the first-pass source code base.

By performing multiple iterations of the second pass, the desired properties of the second programming language (such as memory safety in Rust) can be achieved in an iterative manner, during which the correctness and wholeness of the second programming language implementation is preserved.

In some examples, the second-pass lexical parser, the second-pass syntax parser, the set of transformation rules, and the second-pass unparser are generated using the TXL programming language.

In some examples, the second programming language is a memory safe programming language. The one or more desired properties of the second programming language comprise memory safety. The second parse tree is generated such that one or more functions of the first parse tree correspond to one or more memory safe functions of the second parse tree.

In some examples, the first programming language is a memory unsafe programming language. Processing the first parse tree by applying a set of transformation rules to generate an second parse tree having one or more desired properties of the second programming language comprises: identifying one or more unsafe parameters or variables of the first parse tree, determining that the one or more functions of the first parse tree are not dependent on any of the one or more unsafe parameters or variables, and for each of the one or more functions of the first parse tree, generating a corresponding memory safe function of the second parse tree.

In some examples, the first programming language is C. The second programming language is Rust. Generating a memory safe function of the second parse tree corresponding to an unsafe function of the first parse tree comprises generating the memory safe function to omit an unsafe keyword of the memory unsafe function.

By realizing memory safety as a desired property of Rust (i.e. the second programming language), the generated second source code base may leverage the memory safety feature of the memory access and concurrency safety check in Rust compilers. A toolchain for converting C to Rust is described, referred to as CRustS, which may address one or more of the limitations of existing C to Rust transpilation (i.e. transformation from one high-level programming language to another) tools, in particular the C2Rust software tools. The described example CRustS toolchain may provide a fully automated system to transform a C project (i.e. a first source code base written in C) into a functionally equivalent Rust project (i.e. a second source code base written in Rust), which may realize one or more advantages. First, it may generate Rust source code that compiles, i.e. the described toolchain may auto-fix compile errors due to discrepancies between C and Rust semantics, thereby guaranteeing functional correctness via binary testing. Second, the described toolchain may realize the memory safety property of Rust in the generated second source code base. Third, the described toolchain may generate Rust source code having a high safe function ratio, e.g. over 99% of Rust function signatures may be generated without having the "unsafe" keyword according to test results. Fourth, the described toolchain may generate Rust source code having a high safe code ratio, e.g. over 40% of generated Rust source code (by source code character count) may be outside of an "unsafe" block according to test results.

In some embodiments, the first pass may be implemented using the open-source C2Rust software tool (which is built using the Clang C compiler and the Rust compiler), as described at https://c2rust.com/. The second pass may be implemented using the source-to-source transformation tool TXL, as described at https://www.txl.ca/. These two software tools (C2Rust and TXL) provide software-based tools which may be used to construct and configure various embodiments described herein in the context of two-pass C-to-Rust source code transformation.

In some aspects, the present disclosure describes a non-transitory processor-readable medium having tangibly stored thereon instructions that, when executed by a processor of a device, cause the device to process a first source code base in a first programming language to generate a second source code base in a second programming language. The first programming language and second programming language are high-level programming languages. A first pass is performed, comprising: processing the first source code base using a first programming language compiler to generate an abstract syntax tree (AST), and processing the AST to generate a first-pass source code base in the second programming language. A second pass is performed, comprising: processing the first-pass source code base and a grammar of the second programming language to generate a first parse tree, processing the parse tree by applying a set of transformation rules to generate a second parse tree having one or more desired properties of the second programming language, and processing the second parse tree using a second-pass unparser to generate the second source code base.

In some aspects, the present disclosure describes a non-transitory processor-readable medium having tangibly stored thereon at least a portion of a second source code base generated in accordance with one or more of the methods described above.

BRIEF DESCRIPTION OF THE DRAWINGS

Reference will now be made, by way of example, to the accompanying drawings which show example embodiments of the present application, and in which:

FIG. 10 is a block of example source code in the Rust high-level programming language generated by transforming the C source code of FIG. 9 using the C2Rust software tool.

FIG. 11 is three example pseudo-code blocks describing TXL transformation rules used to realize a memory safety property of a Rust parse tree, according to example embodiments described herein.

Similar reference numerals may have been used in different figures to denote similar components.

DESCRIPTION OF EXAMPLE EMBODIMENTS

In examples disclosed herein, methods, devices and media are described that provide two-pass source code transformation from a first high-level programming language to a second high-level programming language.

Example Computing Devices

Figure 5:
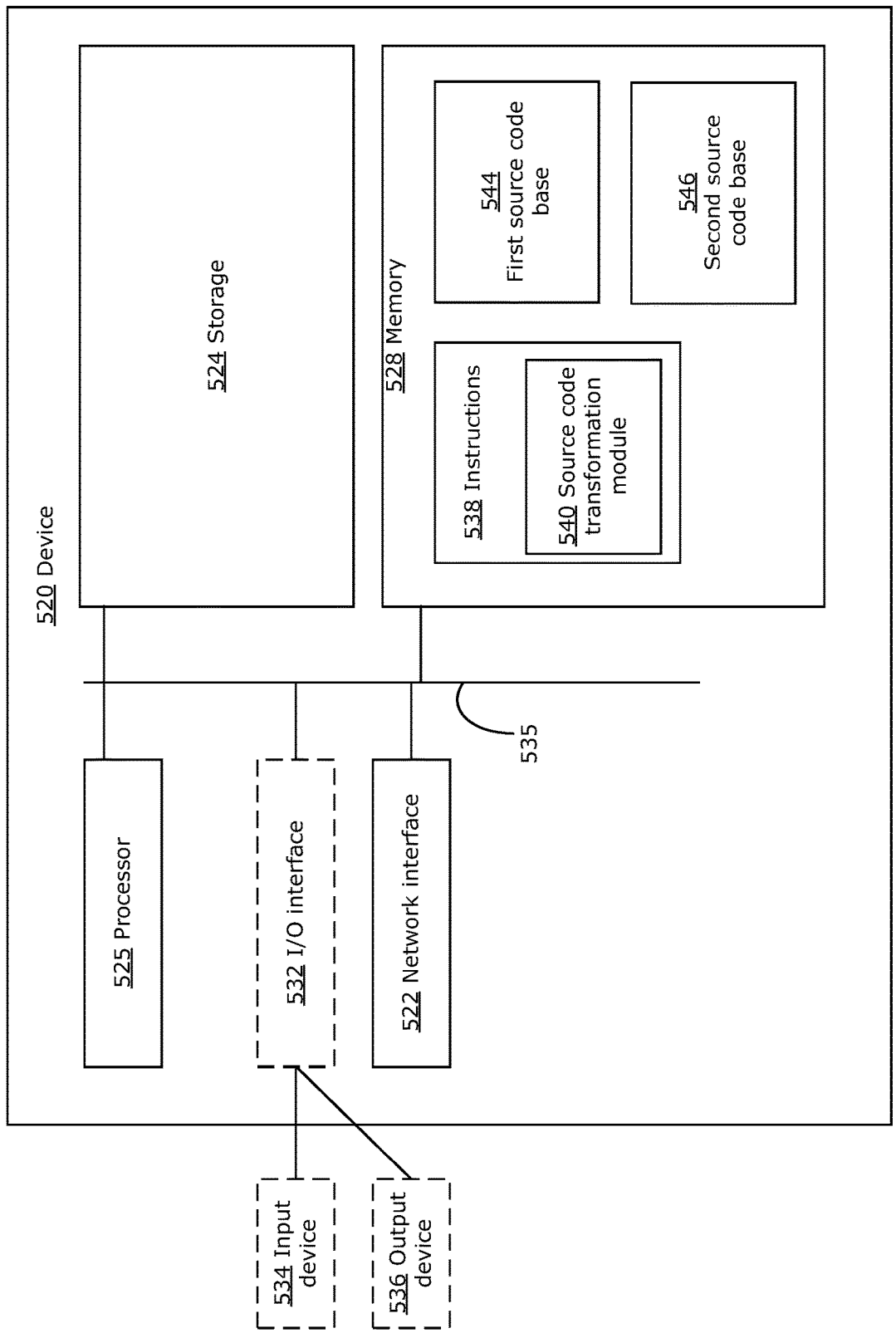
FIG. 5 is a block diagram showing components of an example device for performing two-pass source code transformation from a first high-level programming language to a second high-level programming language, according to example embodiments described herein.

FIG. 5 is a block diagram illustrating a simplified example of a device 520, such as a computer or a cloud computing platform, suitable for implementing examples described herein, and in particular for executing the method steps and operations described herein. Other examples suitable for implementing embodiments described in the present disclosure may be used, which may include components different from those discussed below. Although FIG. 5 shows a single instance of each component, there may be multiple instances of each component in the device 520.

The device 520 of FIG. 5 illustrates an environment in which a first source code base 544 may be transformed into a second source code base 546 using the methods described herein. The device 520 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 525). The device 520 may also include one or more optional input/output (I/O) interfaces (collectively referred to as I/O interface 532), which may enable interfacing with one or more optional input devices 534 and/or optional output devices 536.

In the example shown, the input device(s) 534 (e.g., a keyboard, a mouse, and/or a microphone) and output device(s) 536 (e.g., a display, a speaker, and/or a printer) are shown as optional and external to the device 520. In other examples, there may not be any input device(s) 534 and output device(s) 536, in which case the I/O interface(s) 532 may not be needed.

The device 520 may include one or more network interfaces for wired or wireless communication with one or more devices or systems of a network, such as a network (collectively referred to as network interface 522). The network interface 522 may include wired links (e.g., Ethernet cable) and/or wireless links (e.g., one or more antennas) for intra-network and/or inter-network communications.

The device 520 may also include one or more storage units 524, which may include a mass storage unit such as a solid state drive, a hard disk drive, a magnetic disk drive and/or an optical disk drive.

The device 520 may include one or more non-transitory memories (collectively referred to as memory 528), which may include a volatile or non-volatile memory (e.g., a flash memory, a random access memory (RAM), and/or a read-only memory (ROM)). The non-transitory memory 528 may store instructions for execution by the processor 525, such as to carry out examples described in the present disclosure. The memory 528 may include other processor-executable instructions 538, such as for implementing an operating system and other applications/functions. In some examples, the memory 528 may include instructions 538 for execution by the processor 525 to implement a source code transformation module 540, as described further below. The source code transformation module 540 may be loaded into the memory 528 by executing the instructions 538 using the processor 525.

The memory 528 may also include a first source code base 544 loaded from storage 524 or from some other source. The source code transformation module 540 may be executed by the processor 525 to transform the first source code base 544 into a second source code base 546 as described herein.

In some examples, the device 520 may additionally or alternatively execute instructions from an external memory (e.g., an external drive in wired or wireless communication with the device 520) or may be provided executable instructions by a transitory or non-transitory computer-readable medium. Examples of non-transitory computer readable (i.e. processor readable) media include a RAM, a ROM, an erasable programmable ROM (EPROM), an electrically erasable programmable ROM (EEPROM), a flash memory, a CD-ROM, or other portable memory storage.

The device 520 may also include a bus 535 providing communication among components of the device 520, including those components discussed above. The bus 535 may be any suitable bus architecture including, for example, a memory bus, a peripheral bus or a video bus.

It will be appreciated that various components and operations described herein can be implemented on multiple separate devices or systems in some embodiments.

Example Source Code Transformation Module and Method

Figure 6:
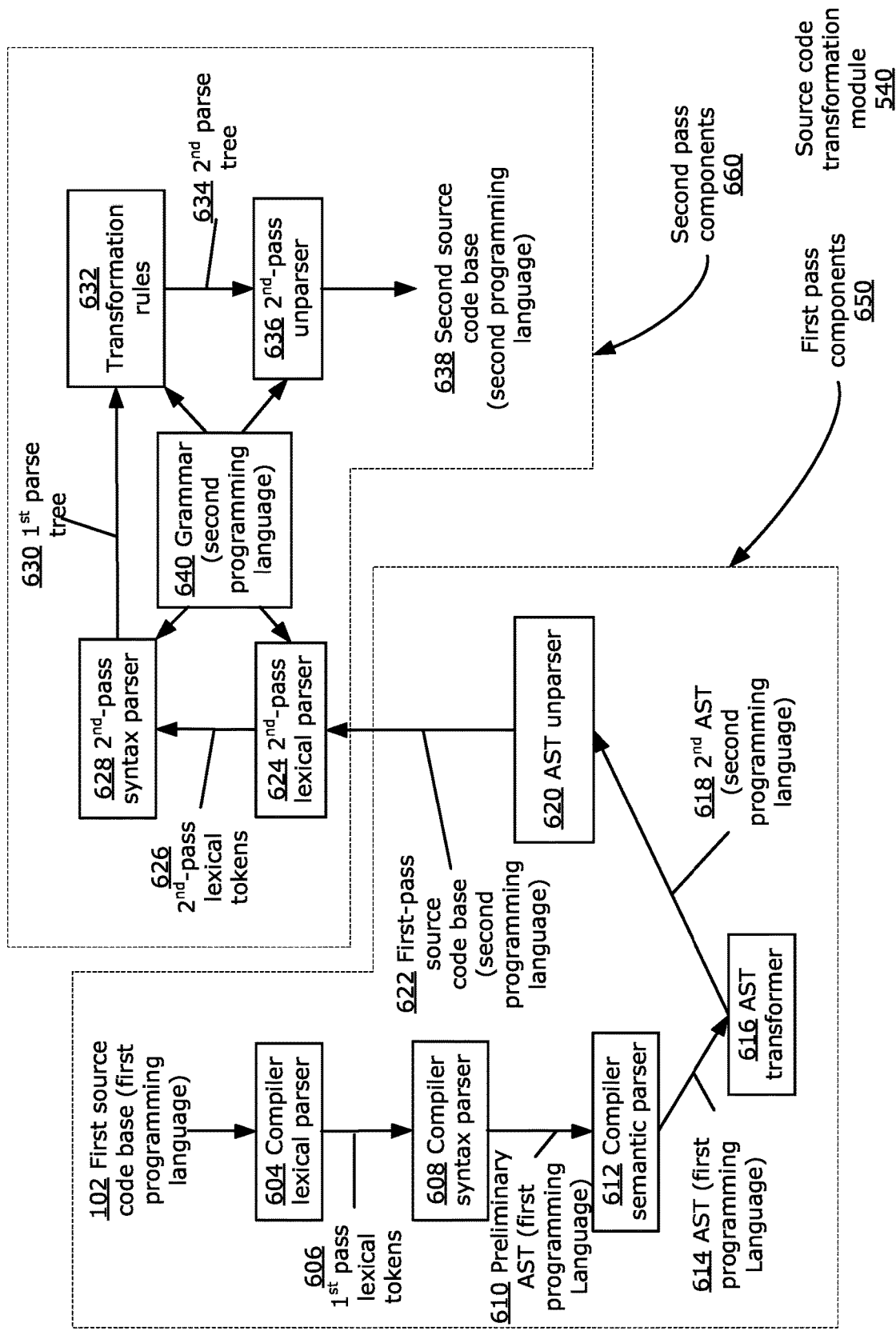
FIG. 6 is a block diagram showing the operation of the source code transformation module of FIG. 5.
Figure 7A:
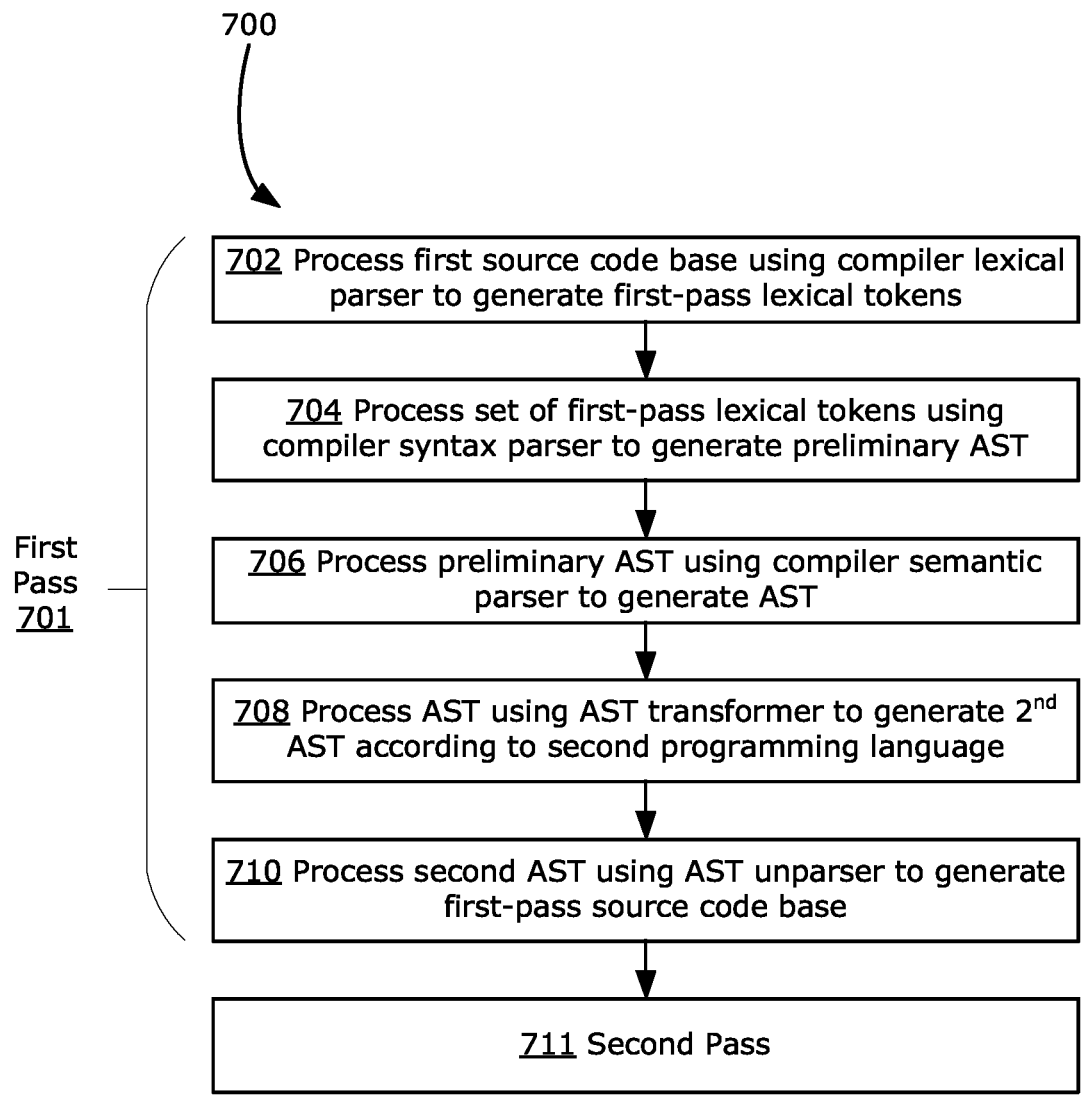
FIG. 7A is a flowchart showing a method for processing a first source code base in a first programming language to generate a second source code base in a second programming language, showing operations of a first pass portion of the method, according to example embodiments described herein.

FIG. 6 shows the operation of the source code transformation module 540 of FIG. 5 as executed by the processor 525. The source code transformation module 540 includes various functional blocks operating upon inputs and generated outputs according to an example method 700 for processing a first source code base in a first programming language to generate a second source code base in a second programming language. The operation of the source code transformation module 540 to perform the operations of the method 700 will be described with reference to FIG. 6, FIG. 7A (which shows operations of the first pass 701 of the method 700), and FIG. 7B (which shows operations of the second pass 711 of the method 700).

The method 700 transforms a first source code base 102 in a first programming language into a second source code base 638 in a second programming language. The first programming language and second programming language are high-level programming languages, as described above. In some embodiments, the method 700 is performed by the source code transformation module 540 in a first pass 701 (shown in FIG. 7A), performed by first pass components 650 (shown in FIG. 6), followed by the second pass 711 (shown in FIG. 7B), performed by second pass components 660 (shown in FIG. 6).

Figure 3:
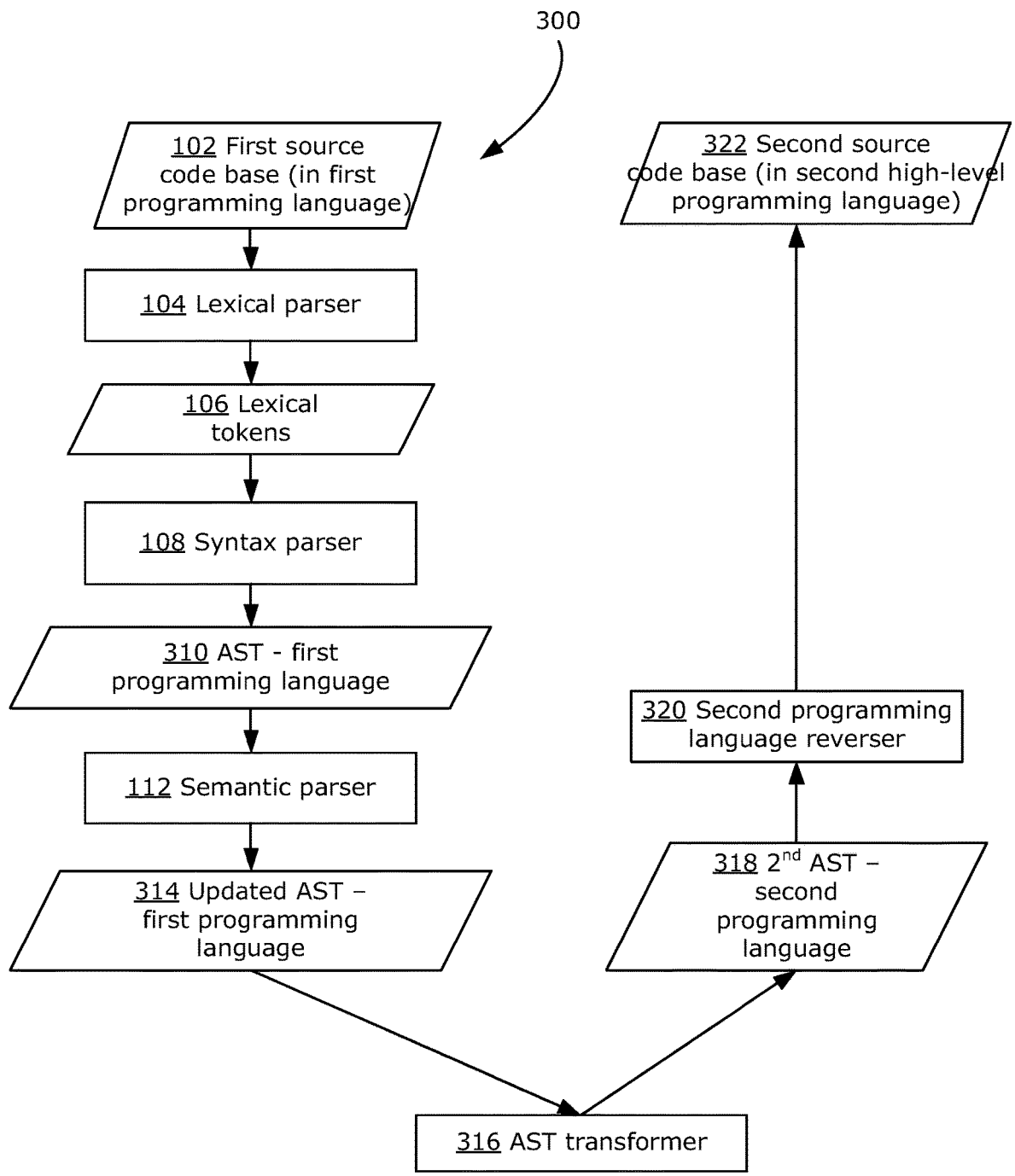
FIG. 3 (prior art) is a flowchart of a first method for source code transformation, using a compiler, from a first high-level programming language to a second high-level programming language.

The first pass 701 of the method 700 generally corresponds to the compiler-based source code translation approach described above with reference to FIG. 3. The first pass 701 begins with operation 702. At 702, a first source code base 102 in a first programming language is processed by a compiler lexical parser 604 to generate a set of first-pass lexical tokens 606. The compiler lexical parser 604 may be a lexical parser of a compiler of the first programming language, such as a lexical parser of a C compiler.

Figure 1:
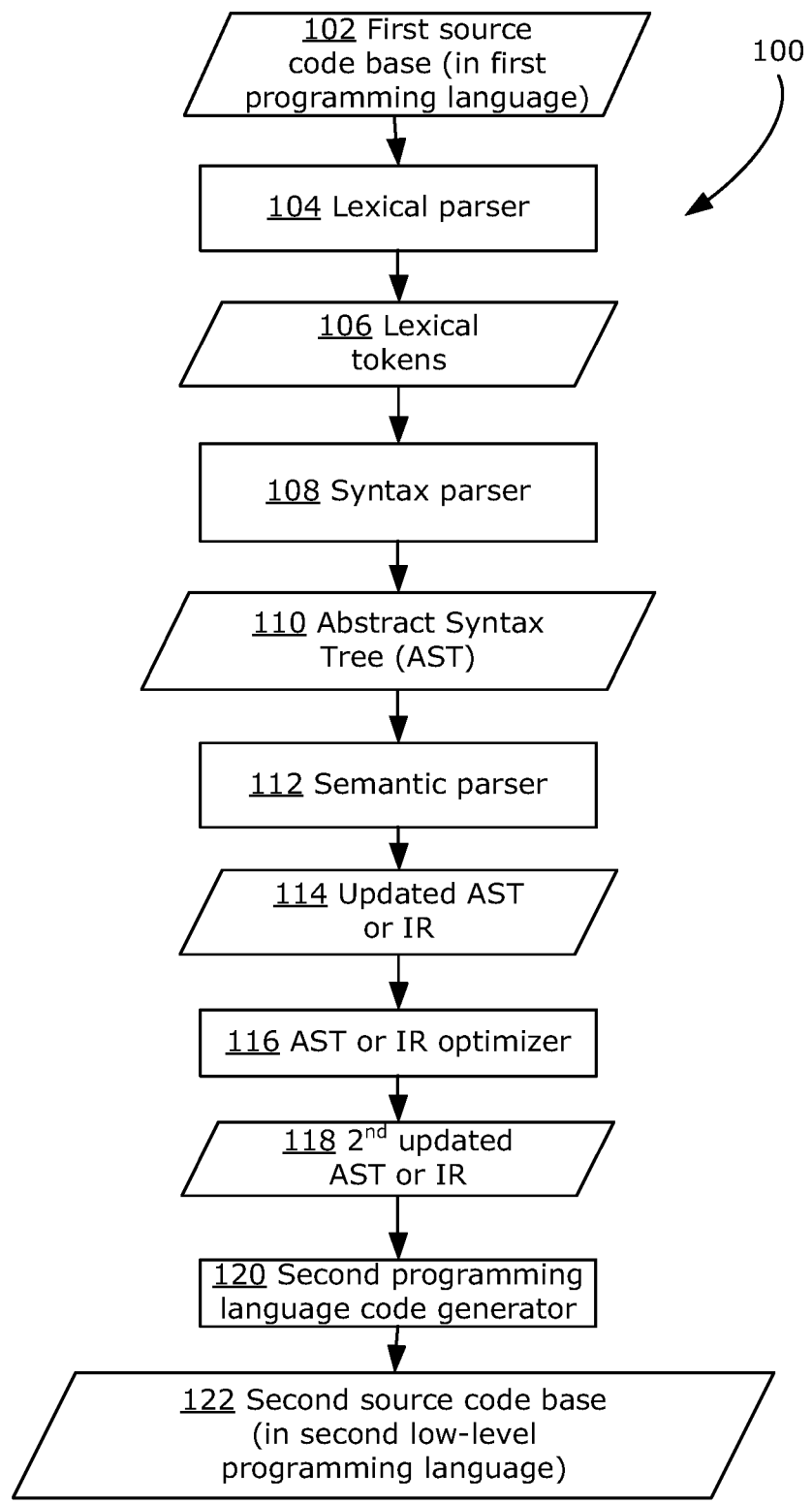
FIG. 1 (prior art) is a flowchart of a method for source code transformation by a compiler from a high-level programming language to a low-level programming language.
Figure 2:
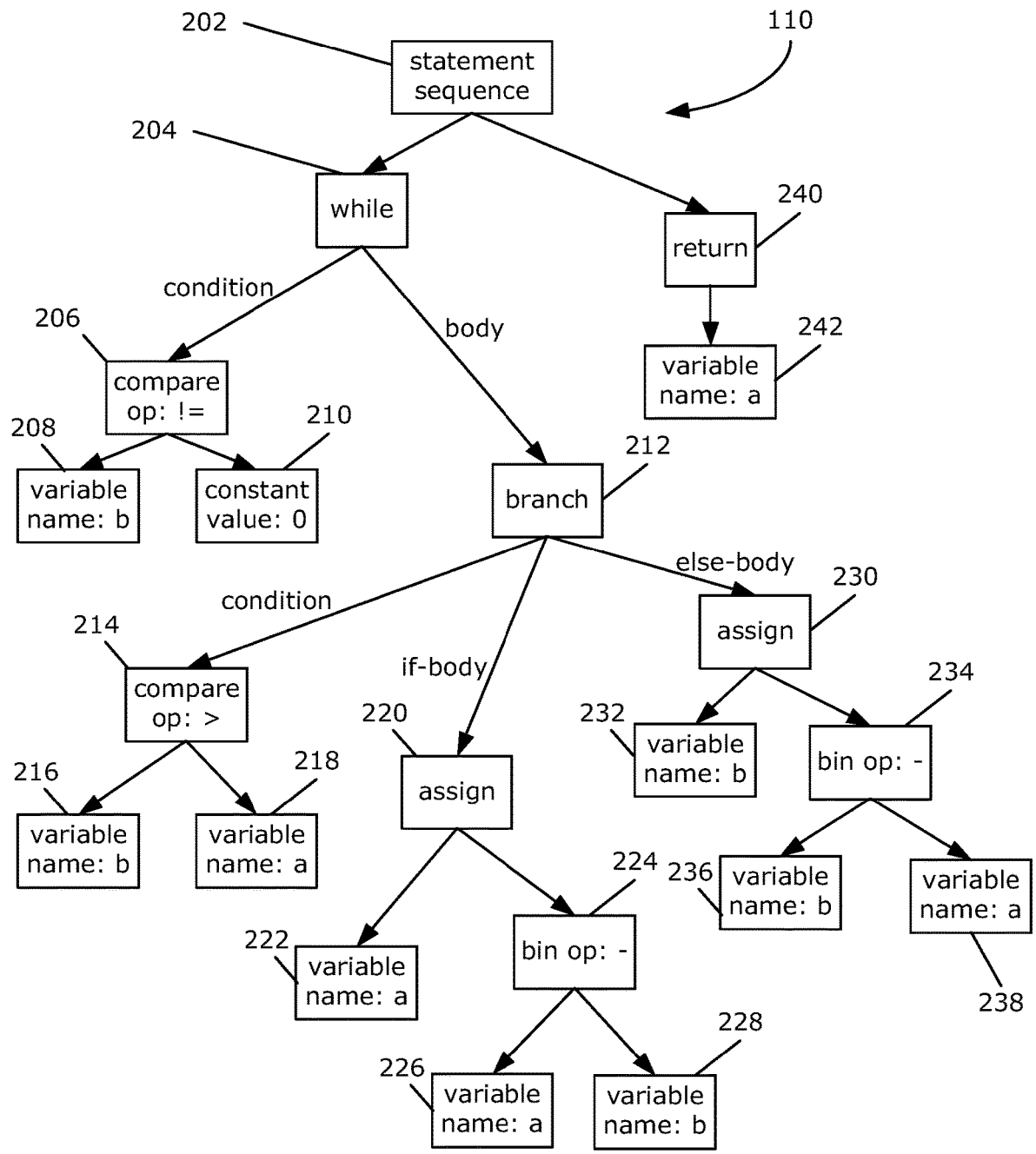
FIG. 2 (prior art) is a schematic diagram of an example abstract syntax tree (AST) generated by the method of FIG. 1.

At 704, the set of first-pass lexical tokens 606 are processed by a compiler syntax parser 608 to generate a preliminary AST 610 according to the first programming language. The AST may be an abstract syntax tree representation of a statement sequence as shown in FIG. 2, wherein the AST structure represents the first source code base. The compiler syntax parser 608 may be a syntax parser of a compiler of the first programming language, such as a syntax parser of a C compiler.

At 706, the preliminary AST 610 is processed by a compiler semantic parser 612 to generate an AST 614 according to the first programming language. The AST 614 generally corresponds to the updated AST 314 described above with reference to the approach of FIG. 3. The compiler semantic parser 612 may be a semantic parser of a compiler of the first programming language, such as a semantic parser of a C compiler.

At 708, the AST 614 is processed by an AST transformer 616 to generate a second AST 618 of the first source code base 102 according to the second programming language. The AST transformer 616 may be generated or composed based on AST definitions for the first programming language and second programming language; these AST definitions may be obtained from compilers of the two respective languages in some examples.

At 710, the second AST 614 is processed by an AST unparser 620, sometimes also called an AST reverser, to generate a first-pass source code base 622 in the second programming language. The first-pass source code base 622 is the output of the first pass 701.

Thus, the first pass 701 relies on semantically-accurate AST definitions obtained from compilers of the first programming language and second programming language, and performs a transformation between the two ASTs (i.e. AST 614 and second AST 618) that preserves semantic information, thereby guaranteeing that the logic (and hence the functionality) of the program encoded by the first source code base in the first programming language is equivalent to the logic of the second source code base in the second programming language.

Figure 4:
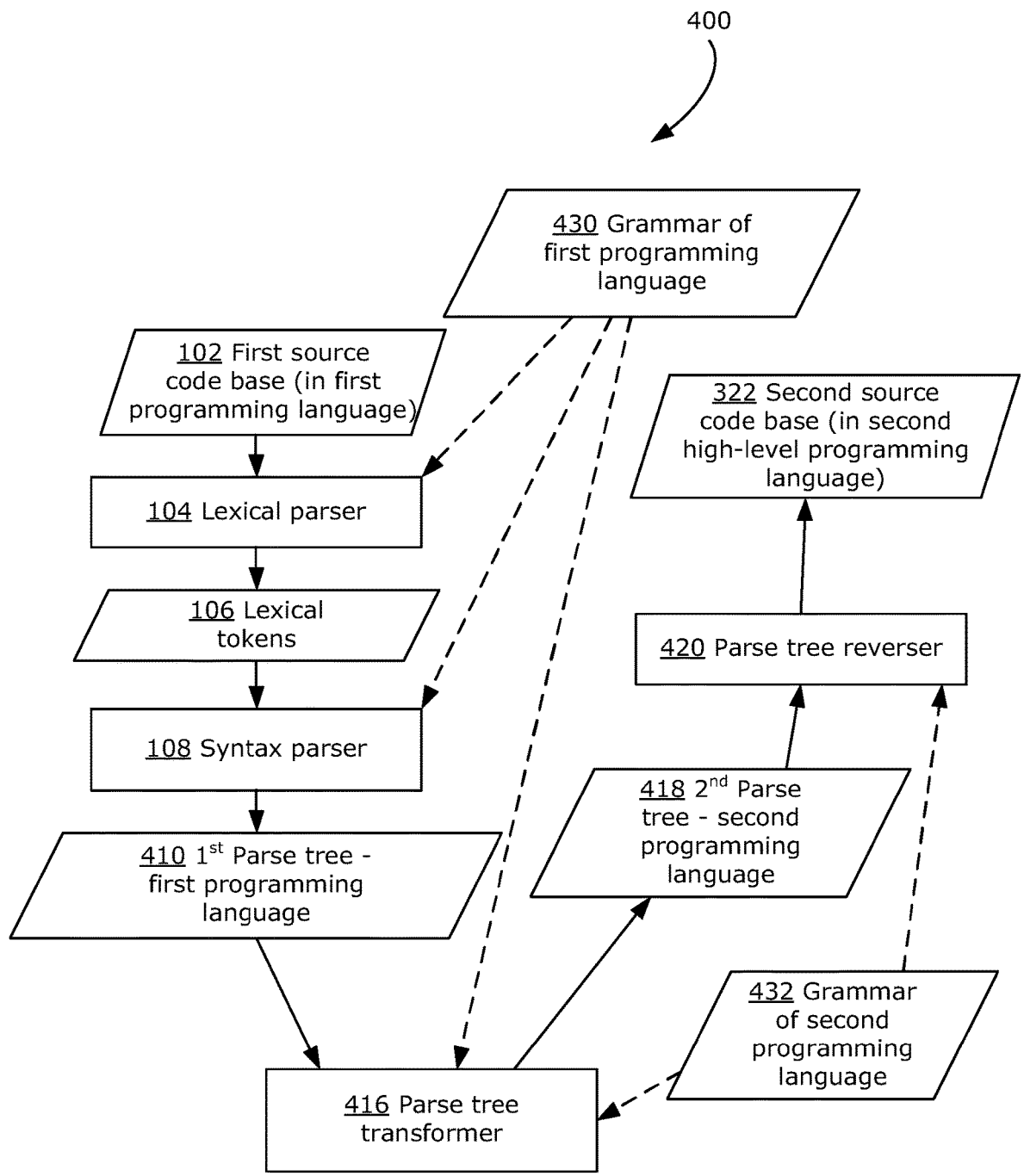
FIG. 4 (prior art) is a flowchart of a second method for source code transformation, using programming language grammars, from a first high-level programming language to a second high-level programming language.

The second pass 711 of the method 700 roughly corresponds to portions of the parse-tree-based source code translation approach described above with reference to FIG. 4. The second pass 711 uses a grammar 640 (e.g., a definition of the syntactic structure) of the second programming language, which may be generated or composed using a source-to-source transformation tool such as the TXL software tool, as described at https://www.txl.ca/. In some examples, the operations of the second pass 711 may be applied iteratively to the first-pass source code base 622 to generate a second source code base 638 having one or more desired properties of the second programming language. Thus, after the second pass 711 has been applied to the first-pass source code base 622 to generate the second source code base 638, the second pass 711 may be applied for a second iteration to the output of the previous iteration, i.e. to process the second source code base 638 to generate a further second source code base, and then optionally iterated one or more additional times, each time using the output of the previous iteration as input.

The second pass 711 begins at operation 712. At 712, the first-pass source code base 622 is processed by a second-pass lexical parser 624 to generate a set of second-pass lexical tokens 626. The second-pass lexical parser 624 may be composed or generated based on the grammar 640 of the second programming language. In some examples, the second-pass lexical parser 624 effectively processes the first-pass source code base 622 and the grammar 640 of the second programming language to generate the set of second-pass lexical tokens 626.

At 714, the set of second-pass lexical tokens 626 is processed by a second-pass syntax parser 628 to generate a first parse tree 630. The second-pass syntax parser 628 may be composed or generated based on the grammar 640 of the second programming language. In some examples, the second-pass syntax parser 628 effectively processes the set of second-pass lexical tokens 626 and the grammar 640 of the second programming language to generate the first parse tree 630.

At 716, the first parse tree 630 is processed by applying a set of transformation rules 632 to generate a second parse tree 634 having one or more desired properties of the second programming language. The set of transformation rules 632 may be composed or generated based on the grammar 640 of the second programming language. In some examples, the set of transformation rules 632 effectively processes the first parse tree 630 and the grammar 640 of the second programming language to generate the second parse tree 634.

In some embodiments, operation 716 includes optional sub-operations 718, 720, and 722 (shown in dashed lines). These sub-operations are described in greater detail below with reference to examples of two-pass C-to-Rust source code transformation, along with examples of desired properties of the second programming language and how they are realized in the second parse tree 634 by operation 716.

At 724, the second parse tree 634 is processed by a second-pass unparser 636 to generate the second source code base 638. The second-pass unparser 636 may be composed or generated based on the grammar 640 of the second programming language. In some examples, the second-pass unparser 636 effectively processes the second parse tree 634 and the grammar 640 of the second programming language to generate the second source code base 638.

Thus, the second pass 711 relies on a syntactically-accurate first parse tree 630 to guarantee that the transformed source code (i.e. the second source code base 638) follows the constraints of the grammar 640 of the second programming language. At the same time, the relaxed semantic constraints of such a parse tree (relative to an AST) enable the performance of semantic-breaking transformations to enhance or realize desired properties of the second programming language, such as usage of new features and semantics of the second programming language that do not exist in the first programming language, and are therefore difficult to introduce during the first pass 701.

In some embodiments, the second-pass lexical parser 624, the second-pass syntax parser 628, the set of transformation rules 632, and the second-pass unparser 636 are generated using the TXL software tool.

Example of Two-Pass C to Rust Source Code Transformation

Example embodiments will now be described with reference to a two-pass method for transforming source code written in C into source code written in Rust such that the generated source code in Rust realizes a desired memory safety feature of the Rust programming language.

The Rust programming language was first published on Jul. 7, 2010. It is designed for high performance system programming, with built-in memory safety and concurrency safety checks in its compiler. In recent years, Rust has gained popularity due to these features, and its development ecosystem has become mature enough to support development for large software systems in commercial settings.

On the other hand, the most popular or mainstream high performance system programming language is still C, which was first standardized in 1989 as ANSI C. A great number of existing software systems are written in C, including the Linux kernel as well as various compilers, device drivers, software frameworks, media file codecs, etc. However, since the design of C puts memory management in the hands of programmers, its lack of memory safety is a longstanding issue, and numerous software bugs and vulnerabilities are directly or indirectly caused by the lack of memory safety features in the C language itself.

As Rust becomes mature, it becomes more and more desirable to be able to translate the source code of software projects written in C into equivalent Rust source code automatically. Such automatic C-to-Rust source code transformation could significantly assist software developers in migrating from C to Rust, and could ease the steep learning curve of the Rust language. Furthermore, the translated (i.e. generated through transformation) Rust source code could serve as a quick and solid foundation to evaluate the feasibility of using a Rust implementation to replace the original C software project.

In light of the desirability of a C-to-Rust source code translator or transformer, several research projects have been conducted in this domain. The most prominent of these research projects is the open-source project C2Rust (described at https://github.com/immunant/c2rust and https://c2rust.com/), which uses compiler technology to parse C source code into a C Abstract Syntax Tree (AST), transpile (i.e. transform) the C AST into a Rust AST, then output the transformed Rust AST as Rust source code. However, this approach exhibits a number of limitations. First, the generated Rust source code typically fails to compile. This is mainly caused by the compiler's transpilation or AST transformation technology being based on AST definitions of the two languages: by trying to translate a C AST into a Rust AST using equivalent semantics, semantic conflicts may arise due to discrepancies between C and Rust. Valid semantics in C can be invalid in Rust, thus causing compile errors. Second, the generates Rust source code typically has low ratios of safe to unsafe functions and code. In order to support high performance low-level operations, Rust provides an "unsafe" keyword that marks a function or source code block as unsafe (i.e. not memory safe), which means that the Rust compiler will not be able to fully check the memory access and concurrency safety of the marked function or source code block. Typically, in Rust source code generated by C2Rust, only a small portion of the Rust source code can be fully checked by the Rust compiler to utilize the Rust memory safety feature, thereby guaranteeing the safety of the compiled source code regarding memory access and concurrency. For example, testing shows that C2Rust typically generates Rust source code in which an average of only 1.5% of functions and 34.3% of source code (by character count) is outside of an "unsafe" block. This low ratio of safe to unsafe source code severely reduces the benefits of migration from C to Rust.

Figure 8:
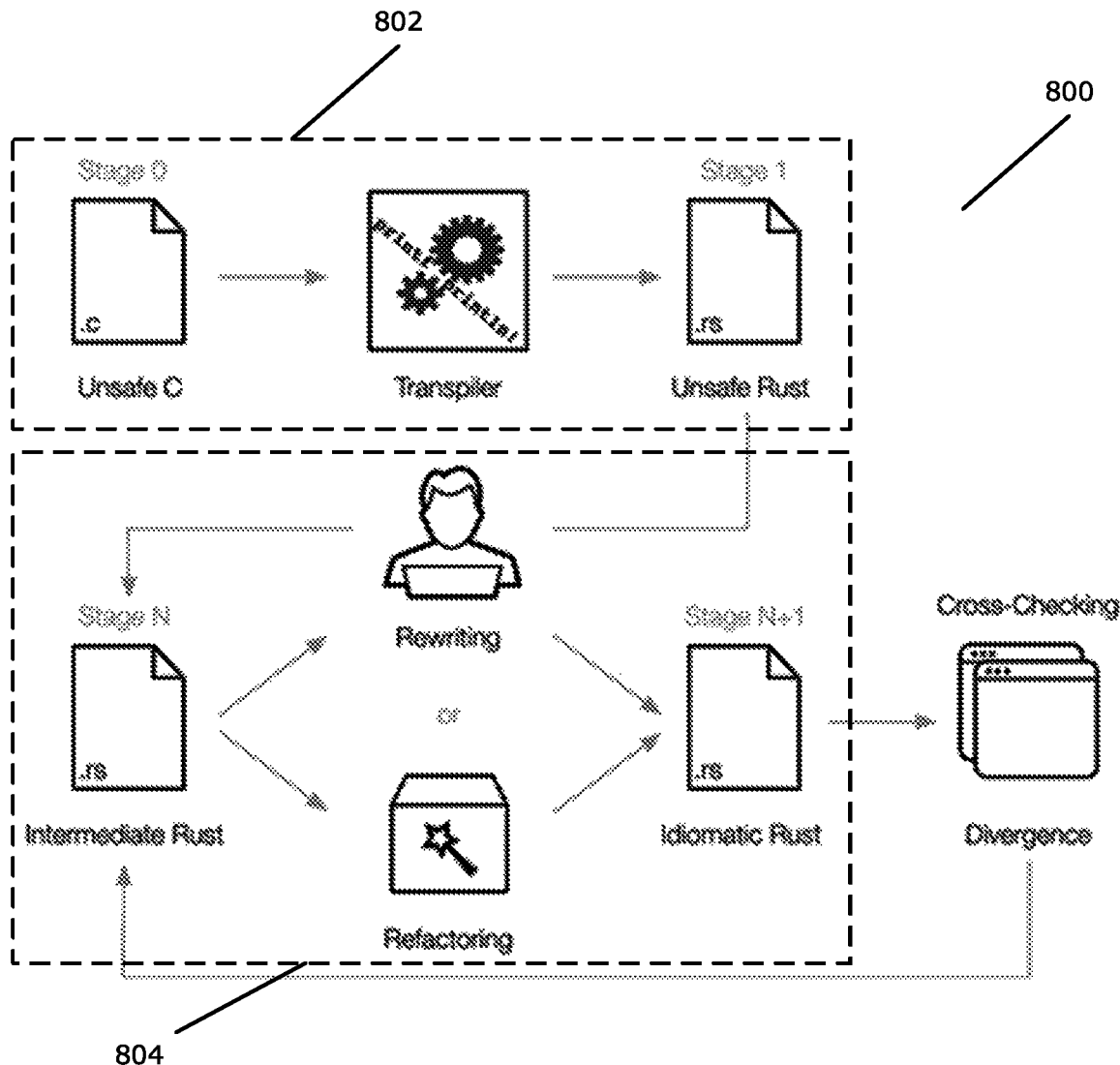
FIG. 8 is a block diagram of a typical C2Rust work flow for manually converting source code from C to Rust using the C2Rust software tool.

In a typical C2Rust work flow, these limitations must be mitigated by manual intervention by a software developer. FIG. 8 is a block diagram of a typical C2Rust work flow 800 for manually converting source code from C to Rust using the C2Rust software tool. The C2Rust work flow from Stage 0 to Stage 1, shown as stage 802, is automated. But to refactor the automatically generated Rust source code to address the limitations described above, manual refactoring and rewriting by a software developer is required at stage 804. The software developer may be required to analyze the original C source and the generated Rust source code, find portions of the source code to refactor, and draft refactor commands (supported by the C2Rust tool chain) to refactor the Rust source code. After one or more iterations of this manual stage 804, the resulting Rust source code may be closer to idiomatic Rust source code. This highlights another limitation of C2Rust: to migrate (i.e. transform) the source code of a large C project, C2Rust would require a significant amount of manual work by developers, and would also require high levels of developer competence, as the developers would need to know C, Rust, the software domain (e.g. the domain-specific requirements of the software application being migrated), and the overall logic of the existing C software project being migrated.

Figure 9:
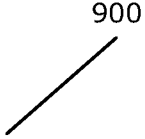
FIG. 9 is a block of example source code written in the C high-level programming language.
Figure 10:
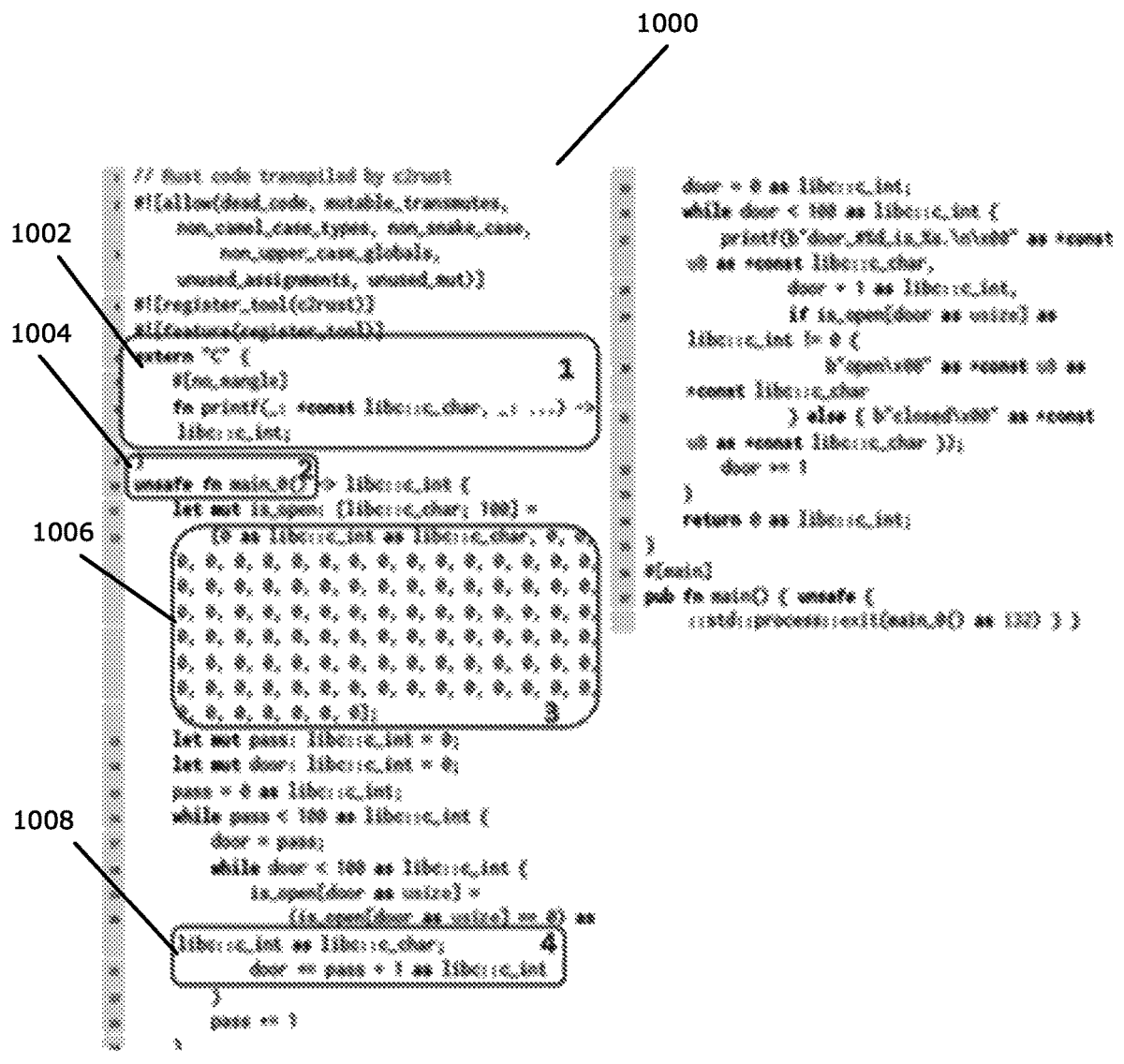

FIGS. 9-10 further illustrates the limitations of C2Rust as a stand-alone tool for transforming C source code to Rust source code. The C source code block 900 shown in FIG. 9 is a simple solution in C for a 100 doors task, drawn from the Rosetta Code open-source project (described at http://www.rosettacode.org/wiki/Rosetta_Code). The C source code block shown in FIG. 9 is as follows, including line numbers along the left edge:

```
1      // C code of 100 doors task
2      #include <stdio.h>
3      int main( )
4      {
5         char is_open[100] = { 0 };
6         int pass, door;
7
8         for (pass = 0; pass < 100; ++pass)
9            for (door = pass; door < 100; door += pass+1)
10              is_open[door] = !is_open[door];
11
12        for (door = 0; door < 100; ++door)
13           printf("door_#%d_is_%s.\n", door+1,
   (is_open[door]? "open" : "closed"));
14
15        return 0;
16     }
```

The transpiled block of Rust source code 1000 output from the C2Rust tool based on the C code block 900 as input is shown in FIG. 10. The transpiled Rust source code block shown in FIG. 10 is as follows, including line numbers along the left edge:

```
1      // Rust code transpiled by c2rust
2      #![allow(dead_code, mutable_transmutes,
```

```
 3            non_camel_case_types, non_snake_case,
                  non_upper_case_globals,
              unused_assignments, unused_mut)]
 4       #![register_tool(c2rust)]
 5       #![feature(register_tool)]
 6       extern "C" {
 7           #[no_mangle]
 8           fn printf(_: *const libc::c_char, _: ...) ->
             libc::c_int;
 9       }
10       unsafe fn main_0( ) -> libc::c_int {
11           let mut is_open: [libc::c_char; 100] =
12               [0 as libc::c_int as libc::c_char, 0, 0,
             0, 0, 0, 0, 0, 0, 0, 0, 0, 0, 0, 0, 0, 0,
             0, 0, 0, 0, 0, 0, 0, 0, 0, 0, 0, 0, 0, 0,
             0, 0, 0, 0, 0, 0, 0, 0, 0, 0, 0, 0, 0, 0,
             0, 0, 0, 0, 0, 0, 0, 0, 0, 0, 0, 0, 0, 0,
             0, 0, 0, 0, 0, 0, 0, 0, 0, 0, 0, 0, 0, 0,
             0, 0, 0, 0, 0, 0, 0, 0, 0, 0, 0, 0, 0, 0,
             0, 0, 0, 0, 0, 0, 0 ] ;
13           let mut pass: libc::c_int = 0;
14           let mut door: libc::c_int = 0;
15           pass = 0 as libc::c_int;
16           while pass < 100 as libc::c_int {
17               door = pass;
18               while door < 100 as libc::c_int {
19                   is_open[door as usize] =
20                   (is_open[door as usize] == 0) as
                 libc::c_int as libc::c_char;
21                   door += pass + 1 as libc::c_int
22               }
23               pass += 1
24           }
25           door = 0 as libc::c_int;
26           while door < 100 as libc::c_int {
27               printf(b"door_#%d_is_%s.\n\x00" as *const
             u8 as *const libc::c_char,
28                   door + 1 as libc::c_int,
29                   if is_open[door as usize] as
                 libc::c_int != 0 {
30                       b"open\x00" as *const u8 as
                     *const libc::c_char
31                   } else { b"closed\x00" as *const
                 u8 as *const libc::c_char });
32               door += 1
33           }
34           return 0 as libc::c_int;
35       }
36       #[main]
37       pub fn main( ) { unsafe {
             ::std::process::exit(main_0( ) as i32) } }
```

Several limitations of the generated Rust source code block 1000 are identified in FIG. 10 in sections 1002, 1004, 1006, and 1008. At 1002 (i.e., lines 6-8), usage of external C application programming interfaces (APIs), which are deemed unsafe by Rust compiler, may result in compilation errors. At 1004 (i.e., lines 9-10), the "unsafe" keyword is included in the Rust source code function signature, thereby disabling the Rust compiler's memory and concurrency safety checks for the function. At 1006 (i.e., line 12), the Rust source code explodes into an element-by-element approach to array initialization. At 1008 (i.e., lines 20-21), Rust primitive types are not used by default; instead, C library types are used in their place. These limitations are difficult, if not impossible, to resolve automatically due to the rigid structure of the AST generated using a compiler-based approach.

An example embodiment of the general method 700 described above may be used to implement CRustS, a two-pass method for C-to-Rust source code transformation. In this example embodiment, C source code may be automatically transformed to Rust source code that has desired memory safety properties of Rust without the need for manual intervention such as manual analysis or refactoring.

In CRustS, the first pass 701 may be implemented using the automatic transformation portion of the C2Rust tool chain (e.g., stage 0 to stage 1 in FIG. 8). In the first pass 701, C2Rust uses a C compiler, Clang, to generate a C AST (i.e. AST 614) from input C source code (i.e. first source code base 102), and uses a Rust AST definition obtained from a Rust compiler, rustc, to perform semantic-preserving transformation from the C AST (i.e. AST 614) to a Rust AST (i.e. second AST 618), C2Rust then borrows the rustc library to unparse the Rust AST (i.e. second AST 618) into Rust source code (i.e. first-pass source code base 622).

The first-pass generated Rust source code (i.e. first-pass source code base 622) is then provided as input to the second pass 711, which is implemented using the TXL software tool. The second pass 711 only roughly resembles existing parse-tree-based approaches such as the one described above with reference to FIG. 4. A large number of transformation rules 632 (e.g., 220 transformation rules generated using TXL) are used at operation 716 of the second pass 711 of CRustS. These transformation rules 632 are used to perform various types of transformation on the Rust parse tree (i.e. first parse tree 630), such as transforming all "libc::*" types to Rust primitive types. A program generated using TXL is typically organized as a set of discrete transformation rules. Each transformation rule performs a specific code transformation, such as transforming the C library type li::c_short to the Rust primitive type i16.

Along with these other transformations, the transformation rules 632 are used to generate a Rust parse tree (i.e. second parse tree 634) that realizes a specific desired property of Rust, namely memory safety. Out of the 220 transformation rules generated using TXL, 18 of the transformation rules are semantic-approximating, i.e. they perform non-equivalent semantic transformation of the parse tree nodes (i.e. transforming between the first parse tree 630 and second parse tree 634).

FIG. 11 shows three example pseudo-code blocks describing some of the 18 TXL transformation rules that are used to realize or enhance the memory safety property of the Rust parse tree (and therefor the generated Rust source code, i.e. second source code base 638). Collectively, the 18 memory safety-focused transformation rules perform a number of operations on the first parse tree 630.

First, the "unsafe" keyword in function signatures is sunk into the function bodies using the "sinkUnsafe" algorithm, shown in code block 1102. Code block 1102 is as follows:

```
Input :    Rust function f: FunctionQualifiers unsafe fn
           IDENTIFIER GenericParams? (
           FunctionParameters? ) FunctionReturnType?
           WhereClause? { InnerAttribute* Statements? }
Output:    Rust function f': FunctionQualifiers fn
           IDENTIFIER
           GenericParams? ( FunctionParameters? )
           FunctionReturnType? WhereClause? { unsafe {
           InnerAttribute* Statements? } }
if FunctionParameters does not contain a parameter that is
  variadic or of unsafe type then
    remove unsafe keyword in f
    enclose function body of f in an unsafe block
end
```

Second, all symbols that can cause an expression to be considered unsafe by the Rust compiler, e.g. static variables, are identified. Third, all variable types that can cause a variable of its type to be considered unsafe, e.g. a function pointer to a function declared as unsafe, are identified.

Fourth, for each function that does not have the "unsafe" keyword in its signature, a "clean unsafe" operations is performed, including several sub-operations. In a first sub-operation, all parameters that can cause an expression to be unsafe, e.g. parameters of unsafe types, are identified. In a second sub-operation, all local variables that can cause an expression to be unsafe, e.g. local variables of unsafe types, or local variables declared using the "unsafe" keyword, are identified. In a third sub-operation, all local variables that are of a raw pointer type are identified. In a fourth sub-operation, safe code in any unsafe block in the function body is promoted outside of unsafe block in order to reduce the amount of unsafe code, using the "cleanUnsafePerFunction" algorithm shown in code block 1104. Code block 1104 is as follows:

```
Input :    unsafeSymbols: a set of symbols that can cause an
           expression to be unsafe
unsafeArguments: a set of arguments that can cause an
expression to be unsafe
unsafeLocalVariables: a set of variable that can cause an
expression to be unsafe
localPointerVariables: a set of variables that are of raw
pointer type
Rust function f: FunctionQualifiers fn IDENTIFIER
GenericParams? ( FunctionParameters? )
FunctionReturnType? WhereClause? { unsafe {
InnerAttribute* Statements? } }
Output:    Rust function f: FunctionQualifiers fn
           IDENTIFIER GenericParams? (
           FunctionParameters? ) FunctionReturnType?
           WhereClause? { InnerAttribute* Statements? }
allUnsafelds ←- unsafeSymbols ∪ unsafeArguments ∪
unsafeLocalVariables
replace unsafe { InnerAttribute* Statements? } with
InnerAttribute* Statements?
foreach statement s in Statements do if
isSafe (s, allUnsafelds, localPointerVariables) = False
  then
      replace s with unsafe block b: unsafe { s }
  end
```

As part of the fourth sub-operation, each statement is tested as to whether it needs to be in an unsafe block (i.e. a block of code marked with the "unsafe" keyword) by using the "isSafe" algorithm shown in code block 1106. Code block 1106 is as follows:

```
Input :: Statement
allUnsafelds: a set of Id's that causes expression to be
unsafe (i.e. Id of unsafe symbols, unsafe types, unsafe
parameters of the function, unsafe local variables)
localPointerVariables: a set of variables that are of raw
pointer type
Output:   True if given s is safe, False otherwise
if s contains any Id ∈ allUnsaf elds then
    return False
end
if s contains any pointer dereference operation then
    return False
end
if s contains invokes asm! macro then
    return False
end
if s contains any macro invocation that contains dereference
of any v ∈ localPointerVariables then
    return False
end
return True
```

In a fifth sub-operation, a sanity check is performed to guarantee that any local variable declared in an unsafe block and all its subsequent uses are in the same unsafe block. In a sixth and final sub-operation, unsafe blocks that are adjacent to each other or nested within each other are merged and simplified.

As described above, test results show that Rust source code automatically generated using the CRustS method results in Rust source code wherein an average of 99.5% of Rust function signatures do not have the "unsafe" keyword (i.e. a very high safe function ratio), and an average of 39.7% of generated Rust source code (by source code character count) may be outside of an "unsafe" block (i.e. a very high safe code ratio). These ratios compare very favorably to existing automatic C-to-Rust source code transformation using C2Rust, in which only an average of 1.5% of functions do not have the "unsafe" keyword and 34.3% of source code (by character count) is outside of an "unsafe" block.

Further details of the safe function ratio of Rust code generated by applying CRustS to unsafe C code are shown in Table 1 below:

TABLE 1

Rust safe function ratios after applying
c2rust and CRustS to unsafe C code

| Project name | LOC | # func | $r_f$(c2rust) | $r_f$(CRustS) |
| --- | --- | --- | --- | --- |
| TLVcodec | 136092 | 73 | 0.014 | 0.959 |
| tinycc | 72394 | 527 | 0.002 | 0.991 |
| RosettaCode* | 7328 | 381 | 0.223 | 0.995 |
| Checked_C | 724402 | 3535 | 0.002 | 0.997 |
| ptrdist-1.1 | 9857 | 236 | 0.021 | 0.983 |
| BusyBox | 303275 | 4589 | 0.003 | 0.647 |

In Table 1: the "Project name" column identifies a publicly available codebase, the "LOC" column indicates the number of lines of code in each codebase, the "#func" column indicates the number of functions in the codebase, the $r_f$(c2rust) column indicates the safe function ratio for code generated using c2rust, and the $r_f$(CRustS) column indicates the safe function ratio for code generated using CRustS. The codebases are of the following types: TLVcodec is an internal C product; tinycc is a tiny C compiler (v0.9.27); RosettaCode* refers to safe functions ratios summed and averaged over 85 RosettaCode tasks in C; Checked_C is a benchmark C project for evaluating Checked C; ptrdist-1.1 is a Pointer-Intensive Benchmark Suite; and BusyBox is an operating system (OS).

Figure 12:
FIG. 12 is a block of example source code in Rust generated by the CRustS method, according to example embodiments described herein.

FIG. 12 shows an example Rust source code block 1200 generated by CRustS. It will be appreciated that the other limitations of automatic C2Rust source code transformation described above, other than memory safety, are also addressed by CRustS. Specifically: no external C APIs are used, all functions are safe, Rust array initialization is performed in its compact grammar (i.e. without code explosion), and Rust primitive types are used, with redundant type casts being removed.

The techniques described in this section ("Two-Pass C to Rust Source Code Transformation") may not be limited to transformation of C source code to Rust source code, but may be generally applicable to processing a first source code base written in a first programming language that is a memory unsafe programming language, to generate a second source code base written in a second programming language that is a memory safe programming language. The one or more desired properties of the second programming language includes at least a memory safety property in these examples. Thus, in some examples, the second parse tree 634 is generated at operation 716 such that one or more functions of the first parse tree 630 correspond to one or more memory safe functions of the second parse tree 634.

Figure 7B:
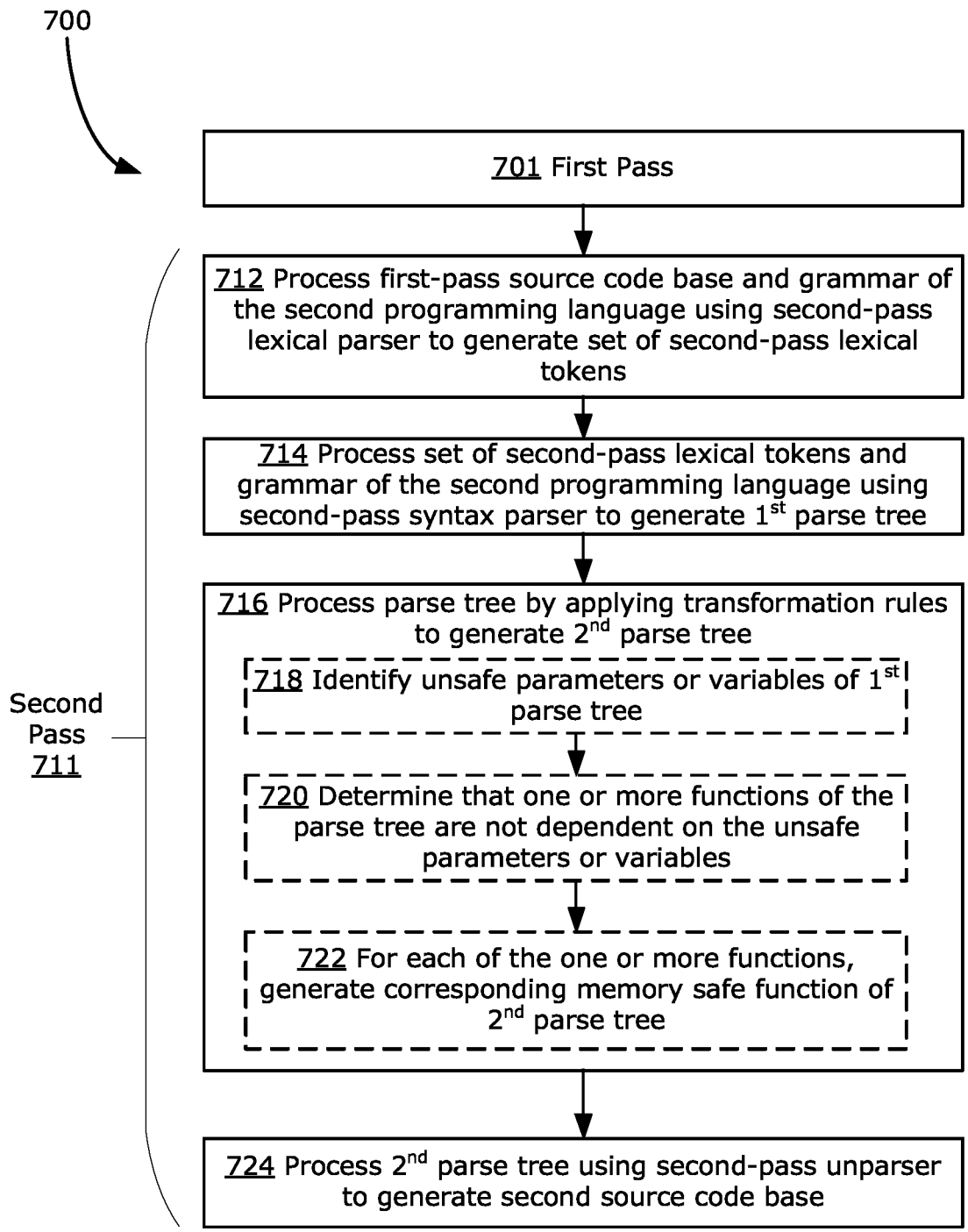
FIG. 7B is a flowchart showing the method of FIG. 7A, showing operations of a second pass portion of the method.

In some examples of memory-unsafe programming language to memory-safe programming language source code transformation, operation 716 of method 700 may include sub-operations 718, 720, and 722, as shown in FIG. 7B.

At 718, the transformation rules 632 are used to identify one or more unsafe parameters or variables of the first parse tree 630. For example, the first sub-operation, second sub-operation, and/or third sub-operation of CRustS described above may be used to identify all parameters and/or all local variables that can cause an expression to be unsafe.

At 720, the transformation rules 632 are used to determine that the one or more functions of the parse tree are not dependent on any of the one or more unsafe parameters or variables. For example, the "isSafe" algorithm of the fourth sub-operation of CRustS described above may be used to test whether a portion of code, such as a function, needs to be in an unsafe block.

At 720, for each of the one or more functions of the first parse tree 630, the transformation rules 632 are used to generate a corresponding memory safe function of the second parse tree 634. For example, the fourth sub-operation of CRustS described above may be used to clean the function body of unsafe code using the "cleanUnsafePerFunction" algorithm.

In some embodiments, generating the memory safe function of the second parse tree 634 corresponding to an unsafe function of the first parse tree 630 comprises generating the memory safe function to omit an unsafe keyword of the memory unsafe function. For example, the first operation of CRustS described above may be used to sink the "unsafe" keyword from a function signature (i.e. of an unsafe function of the first parse tree 630) into the function body; the fourth sub-operation may then be used to clean the function body of unsafe code using the "cleanUnsafePerFunction" algorithm.

In general, it will be appreciated that the methods described herein may be used to transform source code from a first high-level language into source code in a second high-level language that has one or more desirable properties of the second high-level language. The desirable properties of the second language may include those identified above (e.g., memory safety, native types of the second language, concise code expressions, no references to external libraries from the first language), but may also include other properties of the second language not explicitly described herein.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Further details of example embodiments, along with experimental results, comparison to other techniques, identification of data used to train and test embodiments, and further references relied upon are set out in the following paper entitled "CRustS: A Transpiler from Unsafe C to Safer Rust", which is to be considered part of this Detailed Description. All external references cited in the paper are hereby incorporated by reference in their entirety.

The invention claimed is:

1. A method for processing a first source code base in a first programming language to generate a second source code base in a second programming language, the first programming language and second programming language being high-level programming languages, the first programming language being a memory unsafe programming language and the second programming language being a memory safe programming language, the method comprising:

performing a first pass, comprising:
processing the first source code base using a first programming language compiler to generate a first abstract syntax tree (AST);
processing the first AST using an AST transformer to generate a second AST according to the second programming language; and
processing the second AST using an AST unparser to generate a first-pass source code base that is in the second programming language; and performing a second pass, comprising:
processing the first-pass source code base that is in the second programming language, based on a grammar of the second programming language, to generate a first parse tree;
processing the first parse tree by applying a set of transformation rules to generate a second parse tree having one or more desired properties of the second programming language including memory safety, at least one transformation rule in the set of transformation rules transforming one or more functions of the first parse tree that are free of memory unsafe parameters or memory unsafe variables to corresponding one or more memory safe functions of the second parse tree; and processing the second parse tree using a second-pass unparser to generate the second source code base that is in the second programming language.

2. The method of claim 1, wherein the transformer is generated based on the first programming language compiler and a second programming language compiler.

3. The method of claim 1, wherein processing the first source code base to generate the first AST comprises:
processing the first source code base using a compiler lexical parser to generate a set of first-pass lexical tokens;
processing the set of first-pass lexical tokens using a compiler syntax parser to generate a preliminary AST; and
processing the preliminary AST using a compiler semantic parser to generate the first AST.

4. The method of claim 1, wherein processing the first-pass source code base that is in the second programming language, based on the grammar of the second programming language to generate the first parse tree comprises:
processing the first-pass source code base and the grammar of the second programming language using a second-pass lexical parser to generate a set of second-pass lexical tokens; and
processing the set of second-pass lexical tokens and the grammar of the second programming language using a second-pass syntax parser to generate the first parse tree.

5. The method of claim 1, wherein:
the second parse tree is generated based on the first parse tree and the grammar of the second programming language; and
the second source code base is generated based on the second parse tree and the grammar of the second programming language.

6. The method of claim 1, further comprising, after performing the second pass:
performing one or more additional iterations of the second pass, each iteration using the second source code base generated by the previous iteration in place of the first-pass source code base.

7. The method of claim 4, wherein the second-pass lexical parser, the second-pass syntax parser, the set of transformation rules, and the second-pass unparser are generated using a TXL programming language.

8. The method of claim 1, wherein:
the first programming language is C;
the second programming language is Rust; and
generating a memory safe function of the second parse tree corresponding to a memory unsafe function of the first parse tree comprises generating the memory safe function to omit an unsafe keyword of the memory unsafe function.

9. The method of claim 1, wherein processing the first parse tree by applying the at least one transformation rule in the set of transformation rules comprises:
identifying one or more memory unsafe parameters or variables of the first parse tree;
identifying the one or more functions of the first parse tree that are not dependent on any of the one or more memory unsafe parameters or variables; and
for each of the identified one or more functions of the first parse tree, generating a corresponding one of the one or more memory safe functions of the second parse tree.

10. A device, comprising:
a memory storing instructions for causing the device to process a first source code base in a first programming language and generate a second source code base in a second programming language, the first programming language and the second programming language comprising high-level programming languages, the first programming language being a memory unsafe programming language and the second programming language being a memory safe programming language; and
at least one processor in communication with the memory, the at least one processor configured, upon execution of the instructions, to perform the following steps:
performing a first pass, comprising:
processing the first source code base using a first programming language compiler to generate a first abstract syntax tree (AST);
processing the first AST using an AST transformer to generate a second AST according to the second programming language; and
processing the second AST using an AST unparser to generate a first-pass source code base that is in the second programming language; and
performing a second pass, comprising:
processing the first-pass source code base that is in the second programming language, based on a grammar of the second programming language, to generate a first parse tree;
processing the first parse tree by applying a set of transformation rules to generate an second parse tree having one or more desired properties of the second programming language including memory safety, at least one transformation rule in the set of transformation rules transforming one or more functions of the first parse tree that are free of memory unsafe parameters or memory unsafe variables to corresponding one or more memory safe functions of the second parse tree; and
processing the second parse tree using a second-pass unparser to generate the second source code base that is in the second programming language.

11. The device of claim 10, wherein the instructions, when executed by the processor, further cause the device to, after performing the second pass:
perform one or more additional iterations of the second pass, each iteration using the second source code base generated by the previous iteration in place of the first-pass source code base.

12. The device of claim 10, wherein processing the first source code base to generate the first AST comprises:
processing the first source code base using a compiler lexical parser to generate a set of first-pass lexical tokens;
processing the set of first-pass lexical tokens using a compiler syntax parser to generate a preliminary AST; and
processing the preliminary AST using a compiler semantic parser to generate the first AST.

13. The device of claim 10, wherein processing the first-pass source code base that is in the second programming language, based on the grammar of the second programming language to generate the first parse tree comprises:
processing the first-pass source code base and the grammar of the second programming language using a second-pass lexical parser to generate a set of second-pass lexical tokens; and processing the set of second-pass lexical tokens and the grammar of the second programming language using a second-pass syntax parser to generate the first parse tree.

14. The device of claim 10, wherein:
the first programming language is C;
the second programming language is Rust; and
generating a memory safe function of the second parse tree corresponding to a memory unsafe function of the first parse tree comprises generating the memory safe function to omit an unsafe keyword of the memory unsafe function.

15. The device of claim 10, wherein processing the first parse tree by applying the at least one transformation rule in the set of transformation rules comprises:
identifying one or more memory unsafe parameters or variables of the first parse tree;
identifying the one or more functions of the first parse tree that are not dependent on any of the one or more memory unsafe parameters or variables; and
for each of the identified one or more functions of the first parse tree, generating a corresponding one of the one or more memory safe functions of the second parse tree.

16. The device of claim 10, wherein the transformer is generated based on the first programming language compiler and a second programming language compiler.

17. The device of claim 10, wherein:
the second parse tree is generated based on the first parse tree and the grammar of the second programming language; and
the second source code base is generated based on the second parse tree and the grammar of the second programming language.

18. A non-transitory processor-readable medium having stored thereon instructions that, when executed by at least one processor of a device, cause the device to process a first source code base in a first programming language to generate a second source code base in a second programming language, the first programming language and second programming language being high-level programming languages, the first programming language being a memory unsafe programming language and the second programming language being a memory safe programming language, the instructions configure the at least one processor, upon execution of the instructions, to perform the following steps:
performing a first pass, comprising:
processing the first source code base using a first programming language compiler to generate a first abstract syntax tree (AST);
processing the first AST using an AST transformer to generate a second AST according to the second programming language; and
processing the second AST using an AST unparser to generate a first-pass source code base that is in the second programming language; and
performing a second pass, comprising:
processing the first-pass source code base that is in the second programming language, based on a grammar of the second programming language, to generate a first parse tree;
processing the first parse tree by applying a set of transformation rules to generate a second parse tree having one or more desired properties of the second programming language including memory safety, at least one transformation rule in the set of transformation rules transforming one or more functions of the first parse tree that are free of memory unsafe parameters or memory unsafe variables to corresponding one or more memory safe functions of the second parse tree; and
processing the second parse tree using a second-pass unparser to generate the second source code base that is in the second programming language.

19. The non-transitory processor-readable medium of claim 18, wherein the instructions further configure the at least one processor, upon execution of the instructions to, after performing the second pass:
perform one or more additional iterations of the second pass, each iteration using the second source code base generated by the previous iteration in place of the first-pass source code base.

20. The non-transitory processor-readable medium of claim 18, wherein processing the first-pass source code base that is in the second programming language, based on the grammar of the second programming language to generate the first parse tree comprises:
processing the first-pass source code base and the grammar of the second programming language using a second-pass lexical parser to generate a set of second-pass lexical tokens; and
processing the set of second-pass lexical tokens and the grammar of the second programming language using a second-pass syntax parser to generate the first parse tree.

* * * * *